United States Patent
Duplys et al.

(10) Patent No.: US 9,967,058 B2
(45) Date of Patent: May 8, 2018

(54) METHOD FOR RECONCILING BIT STRINGS OVER A COMMUNICATIONS NETWORK

(71) Applicant: Robert Bosch GmbH, Stuttgart (DE)

(72) Inventors: Paulius Duplys, Markgroeningen (DE); Christopher Huth, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 15/185,976

(22) Filed: Jun. 17, 2016

(65) Prior Publication Data
US 2016/0380723 A1    Dec. 29, 2016

(30) Foreign Application Priority Data
Jun. 25, 2015   (DE) .......... 10 2015 211 817

(51) Int. Cl.
*H03M 13/11* (2006.01)
*H04L 1/00* (2006.01)
*H04W 4/00* (2018.01)

(52) U.S. Cl.
CPC .......... *H04L 1/0057* (2013.01); *H04L 1/0083* (2013.01); *H04W 4/005* (2013.01)

(58) Field of Classification Search
CPC ..................................................... H03M 13/11
USPC ........................................ 714/758, 762, 759
See application file for complete search history.

(56) References Cited

U.S. PATENT DOCUMENTS

| | | | | |
|---|---|---|---|---|
| 6,175,560 B1 * | 1/2001 | Bhagalia | ............... | H04B 1/707 370/320 |
| 2013/0024460 A1 * | 1/2013 | Peterson | ................ | G06F 3/061 707/741 |

FOREIGN PATENT DOCUMENTS

DE    102014212224    12/2015

* cited by examiner

*Primary Examiner* — Fritz Alphonse
(74) *Attorney, Agent, or Firm* — Norton Rose Fulbright US LLP; Gerard Messina

(57) ABSTRACT

A method for reconciling bit strings over a communications network. A first subscriber ascertains error correction information for each one of a plurality of different blocks, which each include a predetermined number of bits from a first bit string, and transmits the same over the communications network. Each of the blocks having at least one bit in common with at least one other one of the blocks.

17 Claims, 1 Drawing Sheet

METHOD FOR RECONCILING BIT STRINGS OVER A COMMUNICATIONS NETWORK

CROSS REFERENCE

The present application claims the benefit under 35 U.S.C. § 119 of German Patent Application No. DE 102015211817.7 filed on Jun. 25, 2015, which is expressly incorporated herein by reference in its entirety.

FIELD

The present invention relates to a method for reconciling bit strings over a communications network, as well as to a processing unit and a computer program for implementation thereof.

BACKGROUND INFORMATION

What is generally referred to as the Internet of Things, i.e., an internetworking of various devices, is becoming increasingly widespread. One of the main applications of the Internet of Things is commonly referred to as the smart home, where many devices are battery-powered and are connected via a wireless link to a central station with which they can communicate.

For a secure communication over the generally unsecured wireless links, the subscribers can use conventional keys, for example. One option for generating a key shared by two subscribers is generally referred to as a physical layer key generation (PHYSEC), for example. A shared key is generated from physical properties of a channel in the wireless link between the two subscribers. Such a method is described, for example, in German Patent Application No. DE 10 2014 212 224.

Such a key must be reconciled between the subscribers in order to rectify any potential errors created during generation thereof.

SUMMARY

The present invention provides a method for reconciling bit strings over a communications network, as well as a processing unit and a computer program for the implementation thereof. Advantageous embodiments are described below.

An example method according to the present invention relates to the reconciliation of bit strings over a communications network. A first subscriber thereby ascertains error correction information for each one of a plurality of different blocks, which each include a predetermined number of, in particular, successive bits from a first bit string, and transmits the same over the communications network. Each of the blocks has at least one bit in common with at least one other one of the blocks.

This leads to a low energy consumption which is especially desirable in battery-powered devices. Also, as little as possible information is thereby divulged to a third party via the key.

Such a bit string may, in fact, also be subdivided into successive blocks of a predetermined number of bits, for example, i.e., the bit string is subdivided into blocks having bits 0 through 7, 8 through 15, etc., a parity bit then being transmitted for each of the blocks to be able to identify errors in the bit string. In response to detection of an error in a block, the block in question may then be divided again, for example, and parity bits may be transmitted, in turn, for these two, then smaller blocks. The blocks may continue to be subdivided in this manner. However, a great deal of information must be thereby exchanged between two subscribers since the transmitter must know in which block the receiver still currently has an error. In addition, the blocks must also be permuted many times, for example, by omitting another bit of a block with every permutation. This is because only an odd number of bit errors may be detected when just one parity bit is used. This requires a pseudo-random number generator, for example. The result is a very high transmission volume, where, on the other hand, a great deal of energy is expended and, on the other hand, a great deal of information on the bit string is divulged. Thus, a back computation to a possible bit string could be performed from the parity bits. Such a method for reconciling a bit string is described, for example, in Gilles Brassard and Louis Salvail, "Secret-Key Reconciliation by Public Discussion" in *Advances in Cryptology*—EUROCRYPT '93, pp. 410-423, Springer, 1994.

On the other hand, the method according to the present invention now eliminates the need for such permutations because the at least one common bit of two different blocks provides for an overlapping, so that these two blocks do, in fact, have bits in common, but not all of the bits thereof are in common. Thus, when checking the particular blocks using the corresponding error correction information, errors may even be detected, which, for example, are not possible to detect in the case of only one block, without permutations, using one parity information bit (for example, parity or syndrome). The volume of data to be altogether transmitted is thereby very small, in particular significantly smaller than in the case of the previously mentioned method. For example, there is also no need for two subscribers to agree on a scheme for such permutations since both subscribers must perform identically. There is also no need for a pseudo-random number generator, for example, that would consume energy unnecessarily. This has the advantage, on the one hand, that little energy is consumed, which is particularly advantageous for battery-powered devices, and, on the other hand, that little information is divulged about the bit string, which may be used as a secret key shared by two subscribers, for example.

It is advantageous if the different blocks each have a predetermined number of successive bits from the first bit string. This allows an especially simple and rapid selection of bits for the respective blocks, since, for example, successive bits in a memory may be selected, and there is no need to consider or compute any pattern or selection method.

Preferably, all bits included altogether in all of the blocks include all of the bits of the first bit string. This makes it possible to ensure that the bit string of another subscriber may be completely checked, respectively corrected by the same.

The blocks advantageously have start bits (i.e., the first bit of a block), which each correspond to bits of the first bit string that differ from one another. This allows the entire first bit string to be covered by a small number of blocks. Thus, the data volume to be transmitted is also reduced.

It is advantageous if the start bits of two blocks, which are successive in accordance with the respective start bits thereof, are shifted in each case by a predetermined number of bits of the first bit string. On the one hand, this allows the overlap between two such blocks to be as small as possible; on the other hand, it allows sufficient overlap to still be present to enable the individual bits to be checked often enough. The number of blocks may be thereby further reduced.

Preferably, the number of bits by which the start bits of two successive blocks is shifted, is individually specified for each pair of successive blocks in accordance with a predefined scheme or is the same for each pair. Thus, for example, a scheme that two subscribers, between which the bit strings are reconciled, know right from the start or, however, agree to before the start of the reconciliation, for example, may specify a number sequence indicating the spacing between the start bits of two successive blocks. Thus, the block may be alternately shifted by three and five bits. Because a shift is agreed upon in advance, no further communication effort ensues during the actual reconciliation. The parameters for the reconciliation may be easily negotiated among the subscribers beforehand. On the other hand, if a fixed number is specified, for example, three, then less computational effort is needed, and, in some instances, even less information needs to be divulged.

The error correction information items are advantageously transmitted over the communications network in accordance with a predetermined sequence, which, in particular, is defined by the start bits of the particular blocks. Thus, for example, the individual error correction information items may be transmitted one after another, i.e., for example, initially for the first block, then for the second block, then for the third block, etc. This makes it possible to simply assign the error correction information of a receiver to the blocks of the bit string thereof.

It is advantageous when the number of bits that each of the blocks includes is specified for each block in accordance with a predefined scheme or is the same for each block. Thus, for example, a scheme that two subscribers, between which the bit strings are reconciled, know right from the start or, however, agree to before the start of the reconciliation, for example, may specify a number sequence indicating the length of the blocks. Thus, the block may alternately be eight and twelve bits long, for example. On the other hand, if a fixed number is specified, for example, eight, then less computational effort is needed, and, in some instances, even less information needs to be divulged. In the case of a bit string of a 256 bit length, a block length of eight bits, and blocks spaced apart by three bits, a number of 83 correction information items to be transmitted results (one block, for example, the first or the last, then only having a length of seven bits).

The error correction information items transmitted over the communications network are preferably received by a second subscriber, and the second subscriber checks and/or corrects a second bit string on the basis of the error correction information. As already mentioned, a simple, rapid and energy efficient reconciliation of bit strings between two subscribers may be performed in this manner in a communications network. The bit strings of the two subscribers, i.e., the first and the second bit string, normally have the same number of bits in this context. However, individual bits of the particular bit strings may deviate from one another. This must be corrected.

The error correction information items advantageously include parity bits, check bits, forward error correction bits and/or syndrome bits. In the case of parity bits, it may be recognized, for example, whether there is an odd number of incorrect bits. The overlapping of individual blocks, however, makes it possible to also recognize errors that are not possible to detect when working with only one block and parity bit. In the case of check bits in the form of a check sum, forward error correction bits or syndrome bits, for example, a suitable checking and correction may likewise ensue. A syndrome is constituted of a multiplication of a code by a check or control matrix, for example, whose result is only dependent on a possible error in the code and not on the code itself. It is, therefore, used for checking the code.

It is advantageous if a radio communications network, such as a WLAN network, Bluetooth etc., is used as a communications network. It is at this point, in particular, that the present method is advantageous since radio communications networks are generally very unreliable and, in addition, are often used for networking many mobile, battery-powered devices where a low-energy communication is advantageous. For example, the communications network may be used in the context of the Internet of Things, in particular of what is generally referred to as a smart home. It is understood, however, that, in the use thereof, the present method is not limited to such communications networks, rather may be used for all possible types of networks, for example, also for wired networks or networks in vehicles or the like.

At least a portion of the bits of the first bit string may preferably be used as the shared key for secure communication in the communications network. If reconciliation is successful, the second bit string corresponds to the first bit string. The present method is especially advantageous for generating a shared secret key since very little information is divulged during the normally necessary reconciliation. It is true that the entire bit string may thereby be used as a key, however, one or a plurality of start and end bits of the bit string may also be omitted when the key is used. This is useful, for example, when the start and end bits are less likely to be properly corrected than are the remaining bits, because the blocks are not able to overlap with other blocks there for checking.

The bit strings are advantageously ascertained from the physical properties of the communications network, in particular of a channel of the communications network existing between a first and a second subscriber. For this purpose, a bit string may be generated by each subscriber from a physical property, such as from a transmit/receive power in a channel of a radio communications network between two subscribers, for example. For that purpose, the transmit/receive power may be simultaneously ascertained by each of the two subscribers at certain time intervals, for example, and, depending on the strength, i.e., whether it is above or below a threshold value, for example, associated with a bit 1 or 0. However, since such a channel between two subscribers is generally not exactly identical in both directions with respect to the physical properties thereof, the bit strings, ascertained by the two subscribers, may differ from one another. It is exactly in such a situation that the present reconciliation method is especially rapid, simple and energy efficient.

A processing unit according to the present invention, for example a (radio) transmitter and receiver unit, is adapted, in particular in terms of software engineering, for carrying out a method according to the present invention. Accordingly, the first subscriber or the second subscriber may, in particular, also be configured as such a processing unit.

It is advantageous to implement the method as a computer program, since this entails especially low costs, particularly when an executing control unit is also used for other tasks and is, therefore, present anyway. Suitable storage media for providing the computer program include, in particular, magnetic, optical and electrical memories, for example, such as hard disks, flash memories, EEPROMs, DVDs, inter alia. A program may also be downloaded over computer networks (Internet, intranet, etc.).

Other advantages and embodiments of the present invention are derived from the description and the appended drawing.

The present invention is schematically illustrated in the figures with reference to an exemplary embodiment and is described below with reference to the figures.

DETAILED DESCRIPTION

Figure 1:
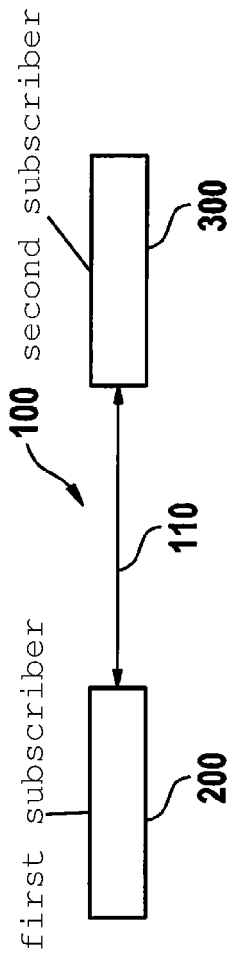
FIG. 1 schematically shows a communications network for implementing a method according to the present invention.

FIG. 1 schematically shows a communications network suited for implementation of a method according to the present invention. Communications network 100 may be a radio communications network, for example, a WLAN network.

Communications network 100 thereby includes a first subscriber 200 and a second subscriber 300 that are able to communicate with one another via a channel 110 of communications network 100. First subscriber 200 may thereby be a base station of a smart home network, which, accordingly, has a transmitter and receiver unit.

Second subscriber 300 may be a subscriber in the smart home network, for example, that is supposed to fulfill a predetermined function, such as temperature measurement or the like. Second subscriber 300 may thereby be battery-powered, in particular, and, accordingly, also have a transmitter and receiver unit.

Figure 2:
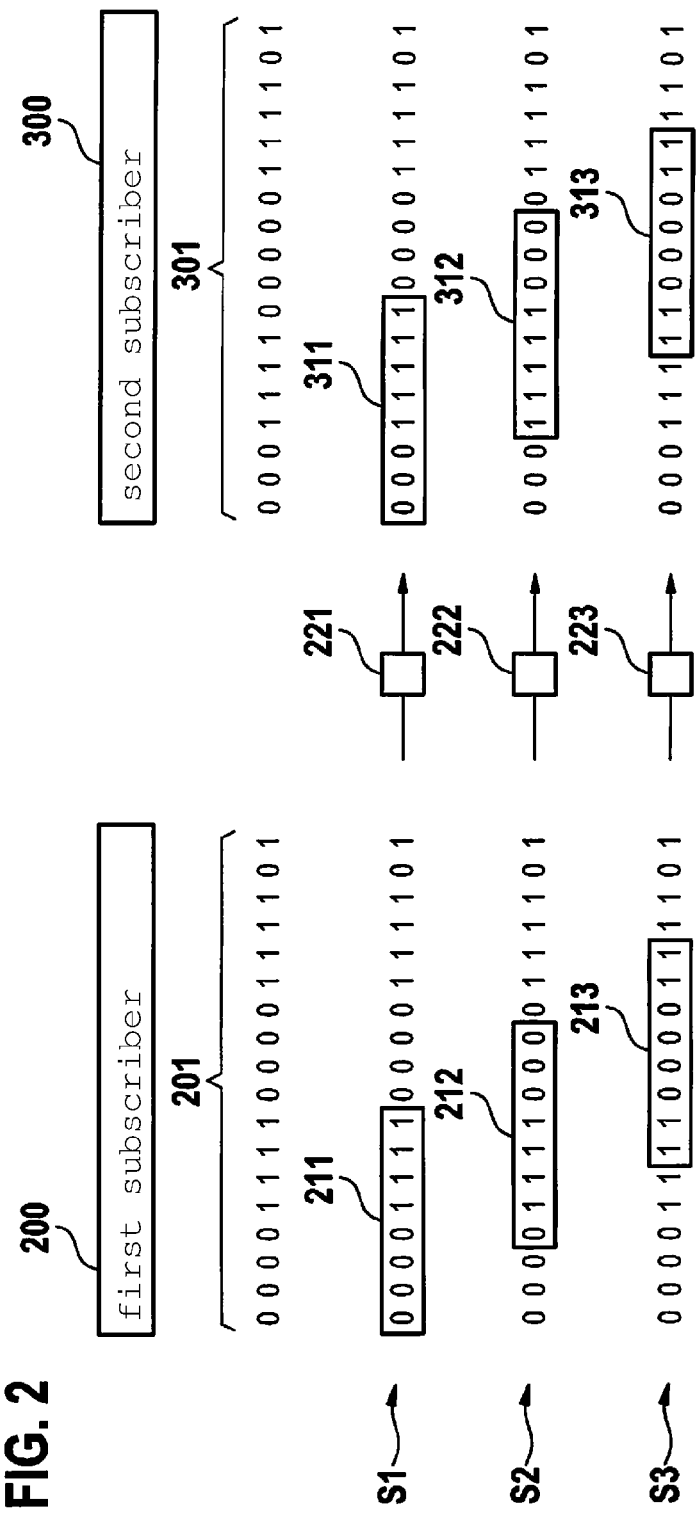
FIG. 2 schematically shows a functional sequence of a method according to the present invention in a preferred specific embodiment.

FIG. 2 schematically shows a functional sequence of a method according to the present invention in a preferred specific embodiment. First subscriber 200 has a first bit string 201. Second subscriber 300 has a second bit string 301. These two bit strings 201 and 301 may thereby have been generated from physical properties of channel 110 of communications network 100. The generation of such bit strings from physical properties of the channel was briefly described at the outset and is generally known. It is, therefore, not explained further in the following.

The two bit strings 201 and 301 may thereby be preferably used as the shared secret key for a secure communication between first subscriber 200 and second subscriber 300 in communications network 100. To this end, however, it is necessary to reconcile the two bit strings and, in some instances, to also correct one of the two bit strings. It is noted in this regard that bit string 301 differs exemplarily from bit string 201 in the fourth bit from the left.

In a step S1, first subscriber 200 now selects a block 211 having a number of exemplarily eight bits, beginning with the first bit (from the left) of bit string 201.

Error correction information 221 is now ascertained for this block 211, respectively for the bits of bit string 201 included in this block 211. For example, this error correction information may be constituted of forward error correction bits, i.e., a code which makes it possible to correct the underlying bits of block 211.

This error correction information 221 is now transmitted to second subscriber 300 via communications network 100.

From second bit string 301 thereof, second subscriber 300 may select a block 311 exemplarily having a number of likewise eight bits, beginning with the first bit (from the left) of bit string 301.

The number of bits of block 311 and the start bit thereof with respect to bit string 301 thereby correspond to the corresponding values of block 211. This number and the start bit may thereby be known to the two subscribers from the beginning, for example.

Second subscriber 300 may now check block 311 thereof on the basis of error correction information 221. For this purpose, it is possible to use what is generally referred to as a Hamming code having a length of eight and a distance of three, what is commonly referred to as a (8,3) Hamming code. Using such a code, it is possible to correct up to one error.

For this, first subscriber 200 may generate a syndrome from the 8-bit code word thereof and send it to second subscriber 300. In this case, the syndrome would be four bits long. It includes the information about the position where the one bit error is, allowing second subscriber 300 to use this error correction information to correct block 311 thereof at the fourth position, i.e., the fourth bit.

In a step S2, first subscriber 200 now selects a block 212, again having a number of exemplarily eight bits, from bit string 201. The start bit of block 212 is thereby shifted exemplarily by three bits to the right relative to the start bit of the preceding block, i.e., block 211, along the bit string.

Error correction information 222 is now ascertained for this block 212, respectively for the bits of bit string 201 included in this block 212, as was already implemented for preceding block 211.

This error correction information 222 is now likewise transmitted to second subscriber 300 over communications network 100. From second bit string 301 thereof, second subscriber 300 may now select a block 312 exemplarily having a number of likewise eight bits, beginning now with the fourth bit (from the left) of bit string 301.

The number of bits that the start bit of block 312 is shifted by relative to the start bit of the preceding block, i.e., block 311, thereby corresponds to the number of bits that block 212 is also shifted by relative to block 211. This number, by which the start bits of two successive blocks are shifted by may thereby be known from the beginning, for example, to the two subscribers.

Second subscriber 300 may now check and correct block 312 thereof on the basis of error correction information 222.

In a step S3, first subscriber 200 selects a block 213, again having a number of exemplarily eight bits, from bit string 201. The start bit of block 213 is thereby again shifted to the right exemplarily by three bits relative to the start bit of the preceding block, i.e., block 212, along the bit string.

Error correction information 223 is now ascertained for this block 213, respectively for the bits of bit string 201 included in this block 212, as was already implemented for preceding block 211.

This error correction information 223 is now likewise transmitted to second subscriber 300 over communications network 100. As also implemented in step S2, subscriber 300 may now select a current block, in the present case, block 313, and, on the basis of current error correction information, in the present case, error correction information 223, perform a check and correction.

This method may now be continued until entire bit string 301 is checked and corrected. Both subscribers 200 and 300 then have the same bit string and may use it as a shared key.

If the number of errors in block 311 does not exceed a specific limit for the selected error correction information, a correction is possible after only one single error correction information item. In some instances, a plurality of bit errors may occur, however, making a correction using a single error correction information item no longer possible.

If, in the method presented here, the subsequent bits, i.e., bits 6, 7, 8 of block 312 are correct, then subscriber 300 may correct the errors in the leading bits (for example, in the two first bits of 312). If, on the other hand, successive blocks without any overlap were shifted, entire block 311, respectively 211 would then have to be rejected after the reconciliation (due to the lack of agreement).

In contrast, in the presented method, only the first three bits would have to be rejected or, alternatively, a repeated correction of block 311 following correction of block 312 may be attempted, after a portion of the erroneous bits in block 311 are replaced by the corresponding, already corrected bits from block 312.

It is also possible in this context that only a portion of the bit string is used as a key. For example, the first and last three bits, which each form the basis of an error correction information item only once and, therefore, are less trustworthy, may remain disregarded when the bit string is used as a key.

It is understood that the numbers in the example for the length and the spacing apart of the blocks may also be differently selected and even also individually for individual blocks, respectively pairs of blocks.

It should be noted that the roles of the two subscribers may also be interchanged, i.e., the second subscriber, for example, which checks and corrects the bit string thereof, may be a base station.

What is claimed is:

1. A method for reconciling bit strings over a communications network, the method comprising:
    ascertaining, by a first subscriber having a processor, error correction information for each one of a plurality of different blocks which each include a predetermined number of bits from a first bit string, each of the blocks having at least one bit from the first bit string in common with at least one other one of the blocks; and
    transmitting, by the first subscriber, the error correction information;
    wherein the method provides secure communications between the first subscriber and another subscriber in the communications network, which is a wireless network having processors and which provides secure communications using a common key to encrypt the communication, and wherein the key is generated from measuring physical properties from common communication channels and generating the key from the bit strings obtained by reconciling the bit strings.

2. The method as recited in claim 1, wherein the different blocks each have a predetermined number of successive bits from the first bit string.

3. The method as recited in claim 1, wherein the bits included in all of the blocks together include all of the bits of the first bit string.

4. The method as recited in claim 1, wherein each of the blocks have start bits that each correspond to bits of the first bit string that differ from one another.

5. The method as recited in claim 4, wherein the start bits of two blocks, which are successive in accordance with the respective start bits thereof, each being shifted by a predetermined number of bits of the first bit string.

6. The method as recited in claim 5, wherein the number of bits by which the start bits of two successive blocks are shifted, being one of: i) individually specified for each pair of successive blocks in accordance with a predefined scheme, or ii) the same for each pair of successive blocks.

7. The method as recited in claim 6, wherein the error correction information is transmitted over the communications network in accordance with a predetermined sequence as defined by the start bits of the blocks.

8. The method as recited in claim 1, wherein the number of bits that each of the blocks includes a specified number for each of the blocks at least one of: i) in accordance with a predefined scheme, or ii) which is the same for each of the blocks.

9. The method as recited in claim 1, further comprising:
    receiving, by a second subscriber, the error correction information transmitted over the communications network; and
    at least one of checking and correcting, but the second subscriber, a second bit string on the basis of the error correction information.

10. The method as recited in claim 1, wherein the error correction information includes at least one of parity bits, check bits, forward error correction bits, and syndrome bits.

11. The method as recited in claim 1, wherein a radio communications network is used as the communications network.

12. The method as recited in claim 1, wherein at least a portion of the bits of the first bit string is used as a shared key for a secure communication in the communications network.

13. The method as recited in claim 1, wherein the first bit string is ascertained from physical properties of the communications network.

14. The method as recited in claim 13, wherein the properties are of a channel of the communications network existing between the first and a second subscriber.

15. A processing unit for reconciling bit strings over a communications network, comprising:
    a processing device configured to perform the following:
        ascertaining error correction information for each one of a plurality of different blocks which each include a predetermined number of bits from a first bit string, each of the blocks having at least one bit from the first bit string in common with at least one other one of the blocks; and
        transmitting the error correction information;
        wherein the method provides secure communications between the first subscriber and another subscriber in the communications network, which is a wireless network having processors and which provides secure communications using a common key to encrypt the communication, and wherein the common key is generated from measuring physical properties from common communication channels and generating the key from the bit strings obtained by reconciling the bit strings.

16. A non-transitory machine-readable storage medium storing a computer program, which is executable by a processor, comprising:
    a program code arrangement having program code for reconciling bit strings over a communications network, by performing the following:
        ascertaining, by a first subscriber having the processor, error correction information for each one of a plurality of different blocks which each include a predetermined number of bits from a first bit string, each of the blocks having at least one bit from the first bit string in common with at least one other one of the blocks; and transmitting, by the first subscriber, the error correction information;

wherein the method provides secure communications between the first subscriber and another subscriber in the communications network, which is a wireless network having processors and which provides secure communications using a common key to encrypt the communication, and wherein the common key is generated from measuring physical properties from common communication channels and generating the key from the bit strings obtained by reconciling the bit strings.

17. The method as recited in claim 1, wherein the communications network includes an internetworking of battery-powered devices, wherein the battery-powered devices are connected via a link to a central station with which the devices communicate, and wherein each of the blocks having the at least one bit from the first bit string in common with at least one other one of the blocks aids in reducing energy consumption in the battery-powered devices and in minimizing information divulged to a third party via a common key.

* * * * *